US012341282B2

(12) United States Patent
Ekins et al.

(10) Patent No.: US 12,341,282 B2
(45) Date of Patent: Jun. 24, 2025

(54) SPRING ENERGIZED ELECTRICAL CONNECTOR

(71) Applicant: Halliburton Energy Services, Inc., Houston, TX (US)

(72) Inventors: Philip Ekins, Frimley (GB); Michael Rimmer, Frimley (GB); Hassan Mansir, Frimley (GB)

(73) Assignee: Halliburton Energy Services, Inc., Houston, TX (US)

( * ) Notice: Subject to any disclaimer, the term of this patent is extended or adjusted under 35 U.S.C. 154(b) by 405 days.

(21) Appl. No.: 17/982,683

(22) Filed: Nov. 8, 2022

(65) Prior Publication Data

US 2024/0154339 A1 May 9, 2024

(51) Int. Cl.
*H01R 13/18* (2006.01)
*H01R 13/187* (2006.01)

(52) U.S. Cl.
CPC ........... *H01R 13/18* (2013.01); *H01R 13/187* (2013.01); *H01R 2201/14* (2013.01); *H01R 2201/20* (2013.01)

(58) Field of Classification Search
CPC .. H01R 13/18; H01R 13/187; H01R 2201/14; H01R 2201/20
See application file for complete search history.

(56) References Cited

U.S. PATENT DOCUMENTS 3,187,088 A * 6/1965 Warner .................. H02G 15/24 174/91
4,204,739 A * 5/1980 Shoenleben ........ E21B 17/0285 439/805
4,627,490 A * 12/1986 Moore .................. E21B 33/047 174/665
5,567,170 A * 10/1996 Kroeber ............... H01R 13/523 439/186

(Continued)

FOREIGN PATENT DOCUMENTS

EP 2033273 B1 4/2015
JP 5639101 B2 12/2014
JP 6989715 B2 1/2022

OTHER PUBLICATIONS

Foreign Communication from Related Application—International Search Report and Written Opinion of the International Searching Authority, International Application No. PCT/US2023/032912, dated Jan. 2, 2024, 12 pages.

*Primary Examiner* — Harshad C Patel
(74) *Attorney, Agent, or Firm* — Conley Rose, P.C.; Rodney B. Carroll

(57) ABSTRACT

A connector assembly comprising a pin connector assembly, a socket connector assembly, and an insulating member. The pin connector assembly comprises a generally cylindrical shape with an outer surface, an inner spring, and mechanically coupled to an electrical cable. The socket connector assembly comprises a generally cylindrical in shape with an inner surface, an outer spring, and mechanically coupled to (Continued)

an electrical cable. The contact surface stress between the pin connector and socket connector can be increased by the inner spring, the outer spring, or both. The contact resistance of the connectors is reduced by the increase in contact surface stress via the spring force. The insulating member can be threadingly coupled to the mated connectors.

16 Claims, 8 Drawing Sheets

(56) References Cited

U.S. PATENT DOCUMENTS

| | | | | |
|---|---|---|---|---|
| 6,379,183 | B1 * | 4/2002 | Ayres | H01R 13/187 439/578 |
| 7,121,872 | B1 * | 10/2006 | Hanks | H01R 24/28 439/805 |
| 7,160,156 | B2 * | 1/2007 | Holliday | H01R 4/5025 439/879 |
| 7,195,505 | B1 * | 3/2007 | Becker | H01R 13/5219 439/282 |
| 7,405,358 | B2 * | 7/2008 | Emerson | H01R 13/5216 174/88 R |
| 7,886,832 | B2 * | 2/2011 | Partouche | E21B 17/0283 166/242.6 |
| 7,901,240 | B2 * | 3/2011 | Jackson | H01R 4/5025 439/465 |
| 8,100,715 | B2 * | 1/2012 | Whitlock | H01R 24/38 439/675 |
| 8,209,855 | B2 * | 7/2012 | Hilberts | H01R 4/20 29/869 |
| 9,071,008 | B2 * | 6/2015 | Zillinger | H01R 13/533 |
| 9,465,173 | B2 * | 10/2016 | Becker | H01R 13/5219 |
| 9,695,645 | B2 * | 7/2017 | Tilley | E21B 47/00 |
| 9,843,113 | B1 * | 12/2017 | Campbell | H01R 4/32 |
| 9,941,622 | B1 * | 4/2018 | Campbell | E21B 17/028 |
| 10,128,613 | B2 * | 11/2018 | Yang | H01R 24/28 |
| 10,135,167 | B2 | 11/2018 | Wollitzer et al. | |
| 10,276,969 | B2 * | 4/2019 | Campbell | H01R 43/005 |
| 10,886,668 | B1 * | 1/2021 | Morello | H01R 9/0518 |
| 11,056,835 | B2 | 7/2021 | Yuratich | |
| 11,587,698 | B2 * | 2/2023 | Glasscock | H01B 7/0216 |
| 11,788,555 | B1 * | 10/2023 | Rimmer | F04D 13/086 415/229 |
| 2005/0048846 | A1 * | 3/2005 | Suzuki | H01R 24/60 439/660 |
| 2008/0132115 | A1 * | 6/2008 | Jackson | H01R 43/005 439/587 |
| 2009/0101328 | A1 * | 4/2009 | Leslie | F16L 25/0018 166/242.6 |
| 2015/0200471 | A1 * | 7/2015 | Melni | H01R 4/56 439/788 |
| 2020/0083636 | A1 | 3/2020 | Zugelder et al. | |
| 2021/0098151 | A1 * | 4/2021 | Gissler | E21B 17/003 |

* cited by examiner

SPRING ENERGIZED ELECTRICAL CONNECTOR

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hydrocarbons, such as oil and gas, are produced from subterranean reservoir formations that may be located onshore or offshore. The construction processes involved in producing or removing these hydrocarbons typically involve a number of construction stages or steps such as drilling a wellbore at a desired wellsite, treating the wellbore to optimize production of hydrocarbons, completing the wellbore with completion equipment, and installing production equipment at the wellsite. Various production operations may be utilized to produce the hydrocarbons including pumping the hydrocarbons to the surface of the earth.

When performing production operations, pump systems, for example, electric submersible pump (ESP) systems, may be utilized when reservoir pressure alone is insufficient to produce hydrocarbons from a well or is insufficient to produce the hydrocarbons at a desirable rate from the well. A common type of ESP system comprises a centrifugal pump suspended on a string of production tubing within a wellbore. The pump is driven by a downhole electrical motor, normally a three-phase AC type. A power cable extends from a controller with a power source at the surface to the electrical motor to supply power.

Typically a motor lead extension (also referred to herein simply as a motor lead) is spliced to the lower end of the power cable and secured with a pothead connector at the upper end of the electrical motor. The pothead connector can secure and insulate the connection of the motor lead to the electric motor. The connection at the upper end of the motor lead to the lower end of the power cable is commonly referred to as a splice. The splice is typically assembled by service personnel on the rig floor and comprises a connector pin connector assembly and an application of insulation material. The insulation materials may allow an ingress of corrosive wellbore fluids when improperly applied to the pin connector assembly causing a loss of conductivity from heat and corrosion. Thus the long term reliability of the splice may depend on the assembly skills of the service personnel. A pin connector assembly design that can be assembled on the rig floor is desirable.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
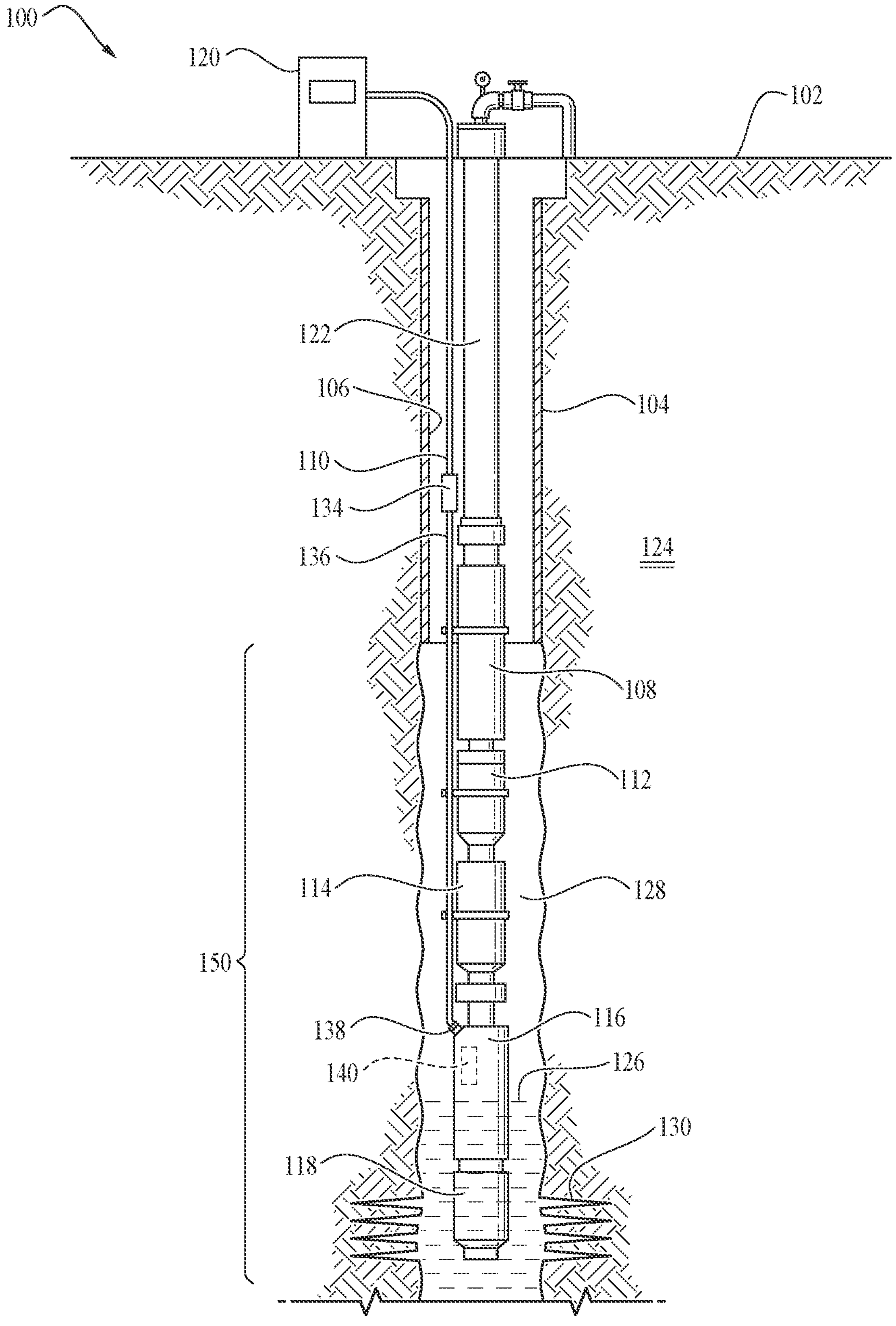
FIG. 1 is an illustration of a wellsite environment with an electric submersible pump assembly according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "uphole," "downhole," "up," and "down" are defined relative to the location of the earth's surface relative to the subterranean formation. "Down" and "downhole" are directed opposite of or away from the earth's surface, towards the subterranean formation. "Up" and "uphole" are directed in the direction of the earth's surface, away from the subterranean formation or a source of well fluid. "Electrically coupled" means that two or more components have communicating internal conductive pathways through which electrics, if present, can flow. A first component and a second component may be "electrically coupled" via a third component located between the first component and the second component if the first component has conductive pathway(s) that communicates with conductive pathway(s) of the third component, and if the same conductive pathway(s) of the third component communicates with conductive pathway(s) of the second component. Electrically coupled components can provide signal communication, electrical power (e.g., voltage, power, capacity, etc.), or both.

Hydrocarbons, such as oil and gas, are produced or obtained from subterranean reservoir formations that may be located onshore or offshore. The development of subterranean operations and the processes involved in removing hydrocarbons from a subterranean formation typically involve a number of construction steps such as drilling a wellbore at a desired wellsite, isolating the wellbore with a barrier material, completing the wellbore with various production equipment, treating the wellbore to optimize production of hydrocarbons, and providing surface production equipment for the recovery of hydrocarbons from the wellhead.

During production operations, artificial lift systems, for example, electric submersible pump (ESP) systems, may be used when reservoir pressure alone is insufficient to produce hydrocarbons from a well or is insufficient to produce the hydrocarbons at a desirable rate from the well. An ESP system is typically transported to the wellsite in sections assembled, attached to the production tubing, and conveyed into the wellbore by the production tubing to a target depth. The typical ESP system is configured with the pump section coupled to the production tubing with the motor section downhole or below the pump section. A power cable is typically mounted or strapped along the outside of the production tubing to provide electrical power to the ESP system.

An ESP system can have multiple configurations for various wellbore servicing operations. In a typical scenario, an ESP system can be installed as a production pump with the motor section below the pump section. In this configuration, the power cable can be located along the outer surface a portion of the pump assembly as the pump section is uphole of the motor section. In a second scenario, an ESP system can be installed as an injection pump with the motor section above the pump section. In this configuration, the power cable can transition from the production tubing to couple directly to the motor section without traversing a portion of the pump assembly. The power cable can pass through a seal, e.g., a packer, installed within the annular space between the outer surface of the production tubing and the inner surface of the casing. In a third scenario, an ESP system may be installed on coil tubing to pump fluid from a reservoir to an annular space. In this configuration, the power cable may extend from surface without being attached to the coil tubing or a production tubing to couple with the motor section and seal section located uphole of the pump exit and pump section. The pump section may have a seal, e.g., a packer, within the annular space between the ESP system and the inner surface of the casing to direct the fluid within the reservoir to flow into or enter the inlet section, to be pressurized, and exit the pump section above the seal into the annular space. In a fourth scenario, an ESP system may be installed as a downhole power source, e.g., an electric generator. An ESP system can be configured with the pump section and seal section uphole of a generator section, e.g., the motor section. The pump section may be coupled to a production tubing with a discharge port located between the pump section and seal section. Injection fluid may be pumped from surface via the production tubing to drive or turn the rotors, e.g., turbines, within the generator section and exit into the wellbore through a discharge section. In this configuration, a power cable can be coupled between the generator section, e.g., the motor section, and a wellbore device located within the wellbore or a power receiving station at surface. The power cable can be located along the pump assembly to electrically couple to a wellbore device below the ESP system.

The present disclosure teaches a connector assembly for coupling the motor lead to the power cable and the motor lead to the stator leads. The connector assembly can comprise a pin connector, a socket connector, and a connector insulator. In some embodiments, the connector assembly can include a slotted connector with a connector spring to bias the slotted connector into contact with the pin connector. For example, the connector spring can increase the contact stress between the pin connector and the socket connector. In some embodiments, the connector insulator can be wrapped about the connector assembly. In some embodiments, the connector insulator can be a sleeve installed about the connector assembly.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming, but would nevertheless be a routine undertaking for those of ordinary skill in the art having the benefit of the present disclosure.

FIG. 1 illustrates a wellsite environment 100, according to one or more aspects of the present invention. While wellsite environment 100 illustrates a land-based subterranean environment, the present disclosure contemplates any wellsite environment including a subsea environment. In one or more embodiments, any one or more components or elements may be used with subterranean operations equipment located on offshore platforms, drill ships, semi-submersibles, drilling barges, and land-based rigs.

In some embodiments, wellsite environment 100 comprises a wellbore 104 extending from a surface 102 to a permeable formation 124. In some embodiments, the wellbore 104 may comprise a nonconventional, horizontal, deviated, multilateral, or any other type of wellbore. Wellbore 104 may be defined in part by a casing string 106 that may extend from a surface 102 to a selected downhole location. Portions of wellbore 104 that do not comprise the casing string 106 may be referred to as open hole.

In some embodiments, various types of hydrocarbons or fluids may be pumped from wellbore 104 to the surface 102 via the production tubing 122 using an electric submersible pump (ESP) assembly 150 disposed or positioned downhole, for example, within, partially within, or outside casing string 106 of wellbore 104. ESP system 150 may comprise various assemblies or sub-assemblies referred to as sections including a pump section 108, an intake section 112, a seal section 114, a motor section 116, and a sensor package 118. In some embodiments, the pump section 108 may comprise one or more centrifugal pump stages, each centrifugal pump stage comprising an impeller mechanically coupled to a drive shaft and a corresponding diffuser held stationary by and retained within the centrifugal pump assembly (e.g., retained by a housing of the centrifugal pump assembly). In some embodiments, the pump section 108 may not contain a centrifugal pump but instead may comprise a rod pump, a piston pump, a progressive cavity pump, or any other suitable pump system or combination thereof.

The pump section 108 may transfer pressure to the production fluid 126 or any other type of downhole fluid to pump or lift the production fluid 126 from the downhole reservoir to the surface 102 at a desired or selected pumping rate. In one or more embodiments, fluid 126 may enter the wellbore 104, casing string 106 or both through one or more perforations 130 in the formation 124 and flow uphole to the intake section 112 of the ESP system 150. In some embodiments, the intake section 112 includes at least one port or inlet for the production fluid 126 within the wellbore to enter into the ESP system 150. The intake section 112 can be fluidically connected to the annulus 128 for the transfer of production fluids 126 to the pump section 108. The centrifugal pump stages within the pump section 108 may transfer pressure to the fluid 126 by adding kinetic energy to the fluid 126 via centrifugal force and converting the kinetic energy to potential energy in the form of pressure. In one or more embodiments, pump section 108 lifts the fluid 126 to the surface 102.

In some embodiments, a motor section 116 can include a drive shaft and an electric motor. A power cable 110 can electrically couple the electric motor of the motor section 116 and to a controller 120 at surface 102. The controller 120 can comprise a variable speed drive system that monitors feedback from one or more downhole devices, e.g., ESP system, and adjusts the voltage and/or current output to maintain operation at the desired setpoints. The controller may control the operation of one or more downhole motors to account for varying downhole conditions. The power cable 110 can provide power to the electric motor, transmit one or more control or operation instructions from controller 120 to the electric motor, or both. In some embodiments, the electric motor 158 may be a two pole, three phase squirrel cage induction motor, a permanent magnet motor, a hybrid (combination of permanent magnet and induction motor) or any other electric motor operable or configurable to provide rotational power.

In some embodiments, the rotational power of the motor section 116 can be transferred from the motor section 116 to the pump section 108 via a drive shaft. A drive shaft within the motor section 116 can rotationally couple to a drive shaft within the seal section 114. The drive shaft within the seal section 114 can rotationally couple to a drive shaft within the intake section 112. The drive shaft within the intake section can rotationally couple to the drive shaft within the pump section 108. The rotational power of the motor section 116 can be transferred to the pump section 108 via a plurality of drive shafts rotationally coupled together.

A splice can be used to electrically couple the electric motor of the ESP pump system 150 to the power cable 110. Although it is possible to directly couple the power cable 110 to the electric motor, most installations of an ESP pump assembly utilize a motor lead extension, also referred to as a motor lead, to splice the power cable 110 to the electric motor. In some scenarios, for example when a wellbore packer or diverter shroud is used, more than one splice and/or motor lead may be utilized. In some embodiments, a connector assembly 134, e.g., a splice, can couple a motor lead 136 to the power cable 110. The motor lead 136 can be a cable that is coupled, e.g., spliced, to the lower end of the power cable 110 and the motor section 116 via a pothead connector 138. In some embodiments, the motor lead 136 can couple, e.g., splice, with the stator lead extensions (also referred to herein simply as stator leads) of the motor section 116 outside of the pothead connector 138. In this scenario, a connector assembly 134A may couple the motor lead to the power cable and a second connector assembly 134B can couple the motor lead to the stator leads outside of the pothead connector 138. The pothead connector can form a seal with the housing of the motor section 116 to prevent harmful wellbore fluids and/or gases from entering into the motor section 116. The pothead connector can also form a seal to the stator leads to prevent the ingress of wellbore fluids via the cable connection. Although one cable (power cable 110 and motor lead 136) is illustrated, it is understood that the power cable 110 and motor lead 136 comprise multiple single cables referred to as phases. A motor lead 136 typically comprises three phases or leads that couple with the stator leads of the three phase electric motor of the motor section 116. Thus the connector assembly 134 provides an electrical connection for each phase or lead of the power cable 110, the motor lead 136, and/or the stator lead. For example, three connector assemblies 134 can be provided for a typical three phase motor to couple the three phases of the power cable 110 to the three phases of the motor lead 136.

In some embodiments, a splice, e.g., connector assembly 134, can be placed within a housing coupled to the outside of the production tubing 122. A splice housing assembly can comprise a cylindrical shaped housing with an end cap mechanically coupled to one or both ends. A power cable 110 can be installed through a port in a first end cap and the motor lead 136 can be installed through a port in a second end cap. The connector assembly 134 can electrically couple the power cable 110 and motor lead 136. The connector assembly 134 can be installed inside of the splice housing with a first end cap sealingly coupling the splice housing and forming a seal on the power cable 110. Likewise, the second end cap can sealingly coupling the splice housing and form a seal on the motor lead 136.

A connector assembly 134 can couple a motor lead 136 to the stator lead inside the motor section 116. In some embodiments, an internal connector 140 can be an embodiment of the connector assembly 134. The motor lead 136 can be coupled to a stator lead with an internal connector 140 with the pothead connector 138 forming a seal on the motor lead 136 to exclude the wellbore environment. The pothead connector 138 can form a seal with the housing of the motor section 116 to prevent harmful wellbore fluids and/or gases from entering into the motor section 116. As previously disclosed, the internal connector assembly 140 can provide an electrical connection for each phase or lead of the motor lead 136 and the stator lead. For example, three connector assemblies 140, e.g., connector assemblies 134, can be provided for a typical three phase motor to couple the three phases of the power cable 110 to the three phases of the motor lead 136 within the motor section 116.

Figure 2A:
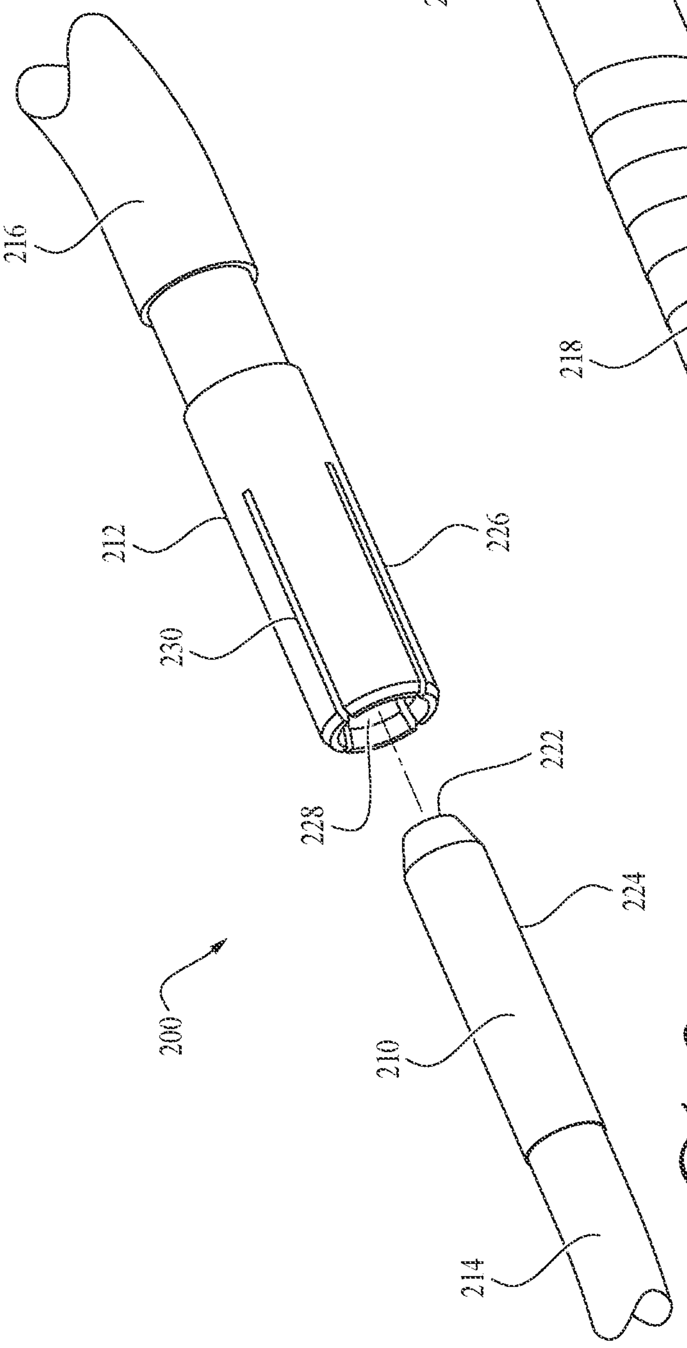
FIG. 2A is an illustration of a connector assembly according to an embodiment of the disclosure.
Figure 2B:
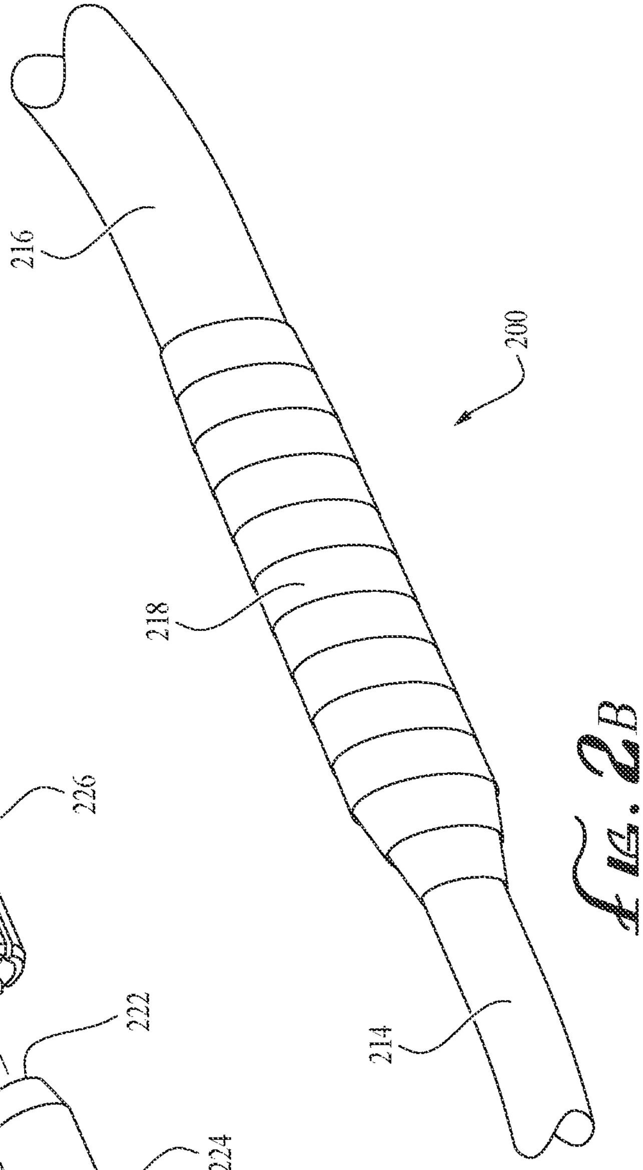
FIG. 2B is an illustration of the connector assembly with an insulation device according to an embodiment of the disclosure.

Turning now to FIGS. 2A and 2B, an embodiment of the connector assembly 134 is described. For example, FIGS. 2A and 2B are an isometric view of an exemplary connector assembly 200, according to one or more embodiments of the present disclosure. The connector assembly 200 can comprise a pin connector 210, a socket connector 212, and an insulating member 218. The pin connector 210 can be a generally cylindrical shape with an outer surface 224 and a tapered end 222. The pin connector 210 can be coupled to the motor lead 214 in a manner to allow the transmission of electrical power and/or signal from the pin connector 210 to the motor lead 214. For example, the pin connector 210 can be soldered, brazed, welded, or crimped to the motor lead 214. The socket connector 212 can be a generally cylinder shape with an outer surface 226 and a receiving bore 228 with an inner surface. The socket connector 212 can include a number of slots 230 extending from the outer surface 226 to the receiving bore 228. Although the socket connector 212 is illustrated with four slots 230 with generally equal radial spacing about the longitudinal axis, it is understood that the socket connector 212 can have 1, 2, 3, 4, 5, 6, 7, 8, 9, 10, or any number of slots 230 radially spaced about the longitudinal axis. The socket connector 212 can be coupled to the power cable 216 in a manner to allow the transmission of electrical power and/or signal from the socket connector 212 to the power cable 216. Although the pin connector 210 is described as coupled to the motor lead 214, it is understood that the pin connector 210 could be coupled to the motor lead 214 or the power cable 216. Although the socket connector 212 is described as coupled to the power cable 216, it is understood that the socket connector 212 could be coupled to the motor lead 214 or the power cable 216.

The pin connector 210 can be installed into the receiving bore 228 of the socket connector 212. The pin connector 210 can have an interference fit, e.g., the outer surface of the pin connector 210 can be larger than the inner surface of the bore 228 of the socket connector 212. The slots 230 in the socket connector 212 can allow the bore 228 of the socket connector 212 to enlarge to accept the larger diameter of the outer surface 224 of the pin connector 210. The slots 230 within the socket connector 212 can form a type of cantilever beam with a spring type bias to provide a normal force along the inner surface of the bore 228. A surface contact along the inner surface of the bore 228 and the outer surface 224 of the pin connector 210 can be generated by the cantilever beams of the socket connector 212.

Turning to FIG. 2B, the insulating member 218 can an insulating tape wrapped on top of the mated pin connector 210 and socket connector 212. The insulating tape can comprise an insulating material, such as a vinyl plastic, with an adhesive material on one side, such as a rubber resin, or a self-amalgamating tape. The insulating tape can be wrapped in a spiral pattern of overlapping tape wraps from the power cable 216, the mated connection, and the motor lead 214.

Connector assembly 200 can be an embodiment of connector assembly 134 located outside of the ESP pump assembly 150 or located anywhere along the production tubing 122. Likewise, connector assembly 200 can be an embodiment of internal connector assembly 140 within the motor section 116 of the ESP pump assembly 150 or within a housing of a downhole device, e.g., an inflow control valve.

Figure 3A:
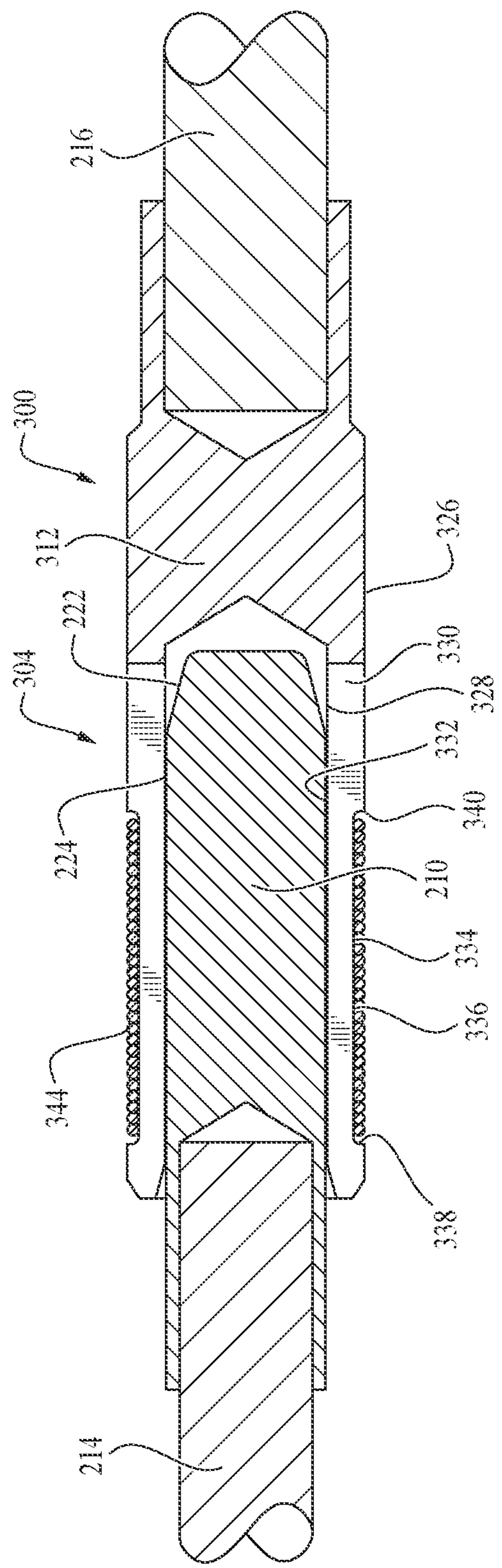
FIG. 3A is partial cross-sectional view of another connector assembly according to an embodiment of the disclosure.
Figure 3B:
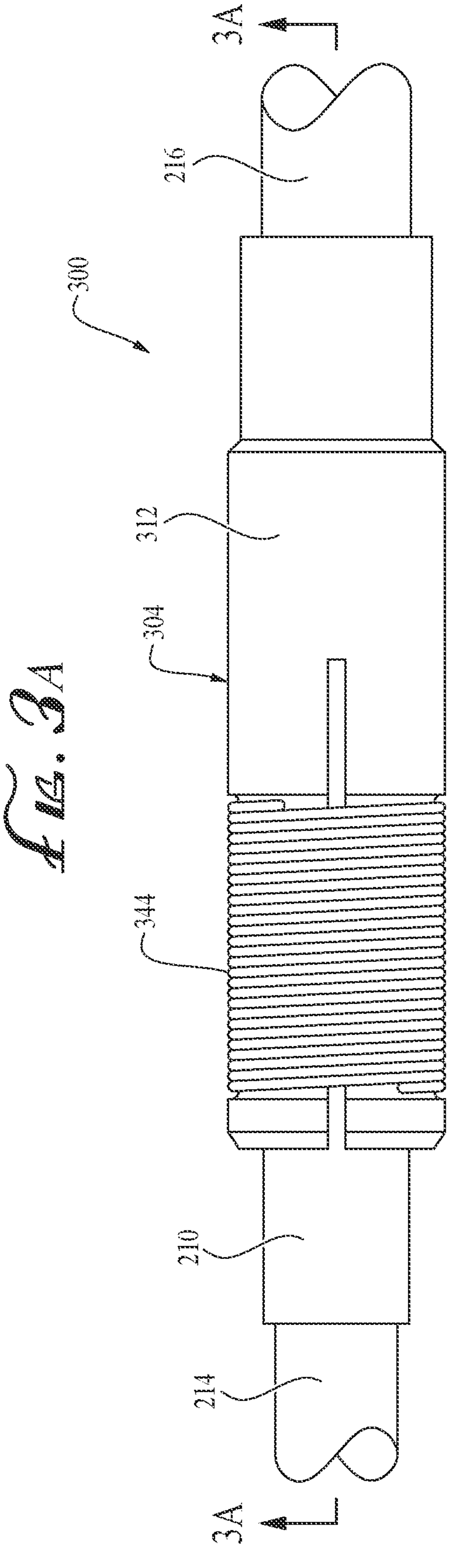
FIG. 3B is an illustration of another connector assembly according to an embodiment of the disclosure.

Turning now to FIGS. 3A and 3B, an embodiment of the connector assembly 134 is described. For example, FIGS. 3A and 3B are a cross-sectional view and a general view of an exemplary connector assembly 300, according to one or more embodiments of the present disclosure. The connector assembly 300 can comprise a pin connector 210, a socket assembly 304, and an insulating member (not shown for clarity). The pin connector 210 can be a generally cylindrical shape with an outer surface 224 and a tapered end 222. The pin connector 210 can be coupled to the motor lead 214. The socket assembly 304 can comprise a socket connector 312 and an outer energizing spring 344. The socket connector 312 can be a generally cylinder shape with an outer surface 326, an outer groove 334, and a receiving bore 328 with an inner surface 332. The outer groove 334 can include an outer surface 336, a front end face 338, and back end face 340. The socket connector 312 can include a number of slots 330 extending from the outer surface 326 to the receiving bore 328. The socket connector 312 can comprise a number of cantilever beams formed by the two or more slots 330. These cantilever beams can deflect outwards or away from the longitudinal axis of the socket connector 312. Although the socket connector 312 is illustrated with four slots 330 with generally equal radial spacing about the longitudinal axis, it is understood that the socket connector 312 can have 1, 2, 3, 4, 5, 6, 7, 8, 9, 10, or any number of slots 230 radially spaced about the longitudinal axis.

The outer energizing spring 344 can be a coil type spring comprised of round shaped wire wound into a spiral helix form, or a set of c-rings, or any discrete element that can provide radially inward force to the cantilever beams formed by the two of more slots 330 of the socket connector 312. The outer energizing spring 344 can be formed, e.g., wound, in a generally cylinder shape with the outer diameter generally the same diameter as the outer surface 326 of the socket connector 312 and the inner diameter generally the same diameter as the outer surface 336 of the outer groove 334. In some embodiments, the outer energizing spring 344 is a set of c-rings, also referred to as snap rings, or a mechanical element that can provide a radially inward force. In some embodiments, inner diameter of the outer energizing spring 344 can be formed with the same diameter as the outer surface 336 of the outer groove 334. In some embodiments, inner diameter of the outer energizing spring 344 can be formed with a smaller diameter as the outer surface 336 of the outer groove 334. The energizing spring can be pre-installed onto the socket connector 312 at a service center or installed at a remote wellsite during the assembly of the connector assembly 300. Although the cross-sectional shape of the wire is illustrated as round, it is understood that the wire can be any geometrical shape, for example, square shaped.

The connector assembly 300 can be utilized to electrically couple an ESP system 150 (reference FIG. 1) to the controller 120 via the power cable 110. In some embodiments, the outer energizing spring 344 can be pre-installed onto the socket connector at the service center. The service personnel can install the pin connector 210 into the receiving bore 328 of the socket connector 312. The outer energizing spring 344 can increase the spring type bias of the socket connector 312 and provide an increase of the normal force along the inner surface 332 of the receiving bore 328. A contact stress along the inner surface 332 of the receiving bore 328 and the outer surface 224 of the pin connector 210 can be generated by the spring type bias of the socket connector 312 and the outer energizing spring 344. The outer energizing spring 344 with a smaller inner diameter than the outer surface 336 of the outer groove 334 can generate a spring stress value in response to installation of the pin connector 210 spreading cantilever beam shape and increasing the diameter of the outer surface 336 of the outer groove 334. The outer energizing spring 344 can generate an increase in contact stress in response to the increase in spring stress level by increasing the inward force generated from the installation and thus can reduce the contact resistance of the electrical connection, e.g., the surface contact, between the pin connector 210 and the socket connector 212. The service personnel can install or apply an insulating member onto the outside of the mated pin connector 210 and socket connector 312 as will be described further herein.

In some embodiments, the outer energizing spring 344 can be installed after the service personnel mate the pin connector 210 into the socket connector 312. In some embodiments, the service personnel can slide the outer energizing spring 344 past the pin connector 210 and onto the motor lead 214. The service personnel can mate the pin connector 210 into the receiving bore 328 of the socket connector 312. The outer energizing spring 344 can then be installed into the outer groove 334 of the socket connector 312. For example, the first turn of the spring wire can be extended from the remaining coils and the first turn can be threaded into the outer groove 334 followed by the remaining turns or wraps of the spring by turning the coil spring body. As previously described, the level of spring stress within the outer energizing spring 344 can apply a spring force that reduces the contact resistance of the electrical connection via an increase in contact stress between the inner surface 332 of the socket connector 312 and outer surface 224 of the pin connector 210. The service personnel can install or apply an insulating member onto the outside of the mated pin connector 210 and socket connector 312 as will be described further herein.

Connector assembly 300 can be an embodiment of connector assembly 134 located outside of the ESP pump assembly 150 or located anywhere along the production tubing 122. Likewise, connector assembly 300 can be an embodiment of internal connector assembly 140 within the motor section 116 of the ESP pump assembly 150 or within a housing of a downhole device, e.g., an inflow control valve.

Figure 4A:
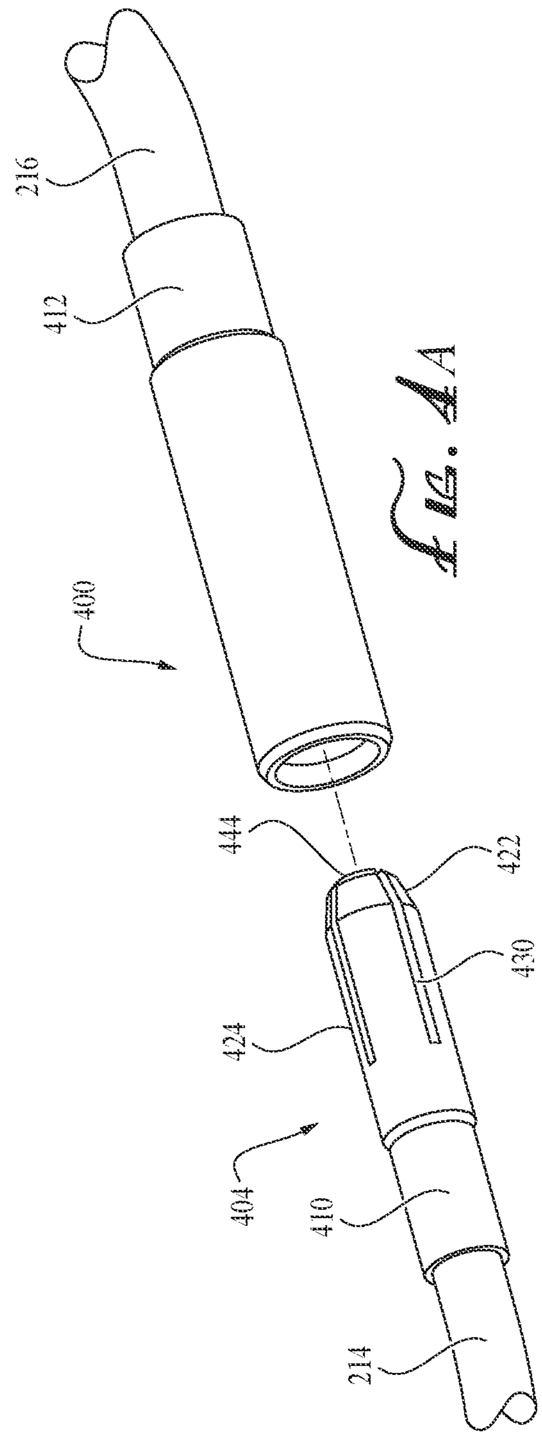
FIG. 4A is an illustration of still another connector assembly according to an embodiment of the disclosure.
Figure 4B:
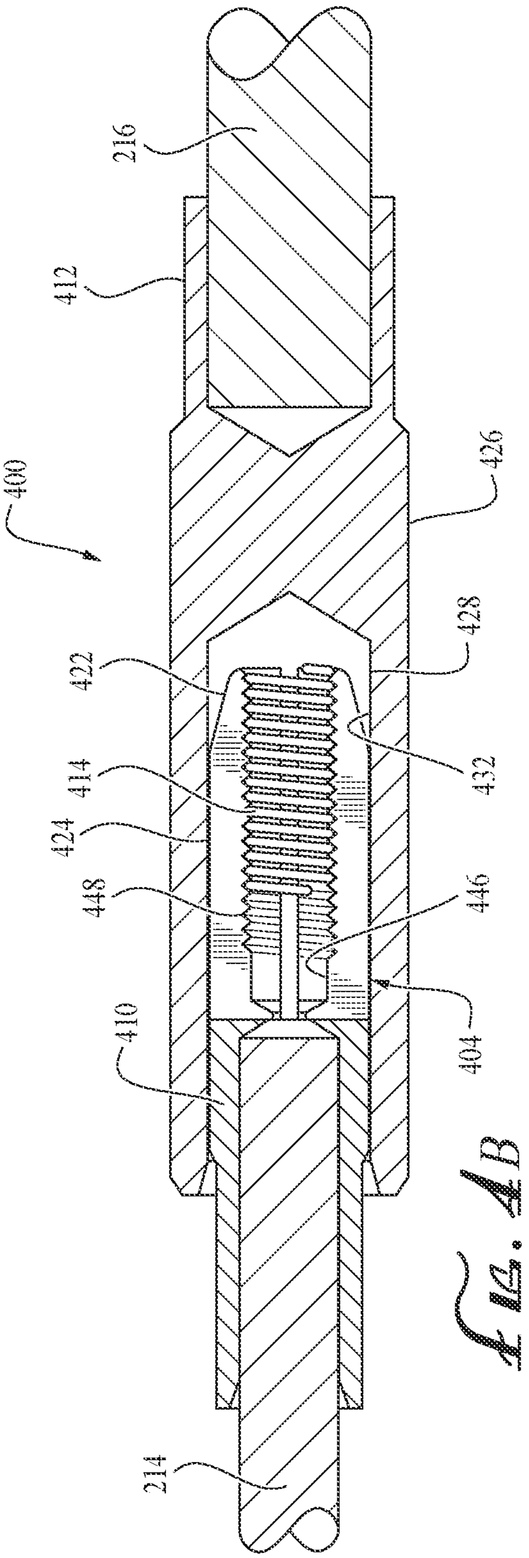
FIG. 4B is partial cross-sectional view of still another connector assembly according to an embodiment of the disclosure.

Turning now to FIGS. 4A and 4B, another embodiment of the connector assembly 134 is described. For example, FIGS. 4A and 4B are an isometric view and a partial cross-sectional view of an exemplary connector assembly 400, according to one or more embodiments of the present disclosure. The connector assembly 400 can comprise a pin assembly 404, a socket connector 412, and an insulating member. The pin assembly 404 comprises a pin connector 410 and an inner energizing spring 414. The pin connector 410 can be a generally cylindrical shape with an outer surface 424, an inner bore 446, and a tapered end 422. The inner bore 446 can include a threaded profile 448 extending a portion of axial distance along the inner bore 446. The pin connector 410 can include a number of slots 430 extending from the outer surface 424 to the inner bore 446 that forms a number of cantilever beams. These cantilever beams can deflect outwards or away from the longitudinal axis of the pin connector 410. The pin connector 410 can be coupled to the motor lead 214. The socket connector 412 can be a generally cylinder shape with an outer surface 426 and a receiving bore 428 with an inner surface 432. The socket connector 412 can be coupled to the power cable 216. Although the pin connector 410 is illustrated with four slots 430 with generally equal radial spacing about the longitudinal axis, it is understood that the pin connector 410 can have 1, 2, 3, 4, 5, 6, 7, 8, 9, 10, or any number of slots 430 radially spaced about the longitudinal axis. In some embodiments, the inner bore 446 can exclude the threaded profile 448. In some embodiments, the inner bore 446 can include a second bore with an inside diameter larger than the inside diameter of the inner bore 446.

The inner energizing spring 414 can be a coil type spring comprised of round shaped wire wound into a spiral helix form. The inner energizing spring 414 can be formed, e.g., wound, in a generally cylinder shape with the outer diameter and the windings or turns of the spring configured to be installed within the threaded profile 448 of the pin connector 410. In some embodiments, outer diameter of the inner energizing spring 414 can be formed with a larger diameter than the threaded profile 448 of the pin connector 410. The inner energizing spring 414 can be pre-installed onto the pin connector 410 or installed at a remote wellsite during the assembly of the connector assembly 400. Although the cross-sectional shape of the wire is described as round, it is understood that the wire can be any geometrical shape, for example, square shaped. Although the inner energizing spring 414 is described as having a wound spring form, it is understood that the inner energizing spring 414 can be any generally cylinder shaped device configured to bias the cantilever arms, for example, a set of retaining rings or a coiled spring pin.

In some embodiments, the inner energizing spring 414 can be installed at the remote wellsite by the service personnel. In some embodiments, the service personnel can thread the inner energizing spring 414 into the pin connector 410. The service personnel can mate the pin assembly 404 into the bore 428 of the socket connector 412. The inner energizing spring 414 can bias the cantilever beams of the pin connector outwards or away from the longitudinal axis. As previously described, the level of spring stress within the inner energizing spring 414 can apply a spring force that reduces the contact resistance of the electrical connection via an increase in contact stress between the inner surface 432 of the socket connector 412 and outer surface 424 of the pin connector 410. The service personnel can install or apply an insulating member onto the outside of the mated pin connector 410 and socket connector 412 as will be described further herein.

Connector assembly 400 can be an embodiment of connector assembly 134 located outside of the ESP pump assembly 150 or located anywhere along the production tubing 122. Likewise, connector assembly 400 can be an embodiment of internal connector assembly 140 within the motor section 116 of the ESP pump assembly 150 or within a housing of a downhole device, e.g., an inflow control valve.

Figure 5:
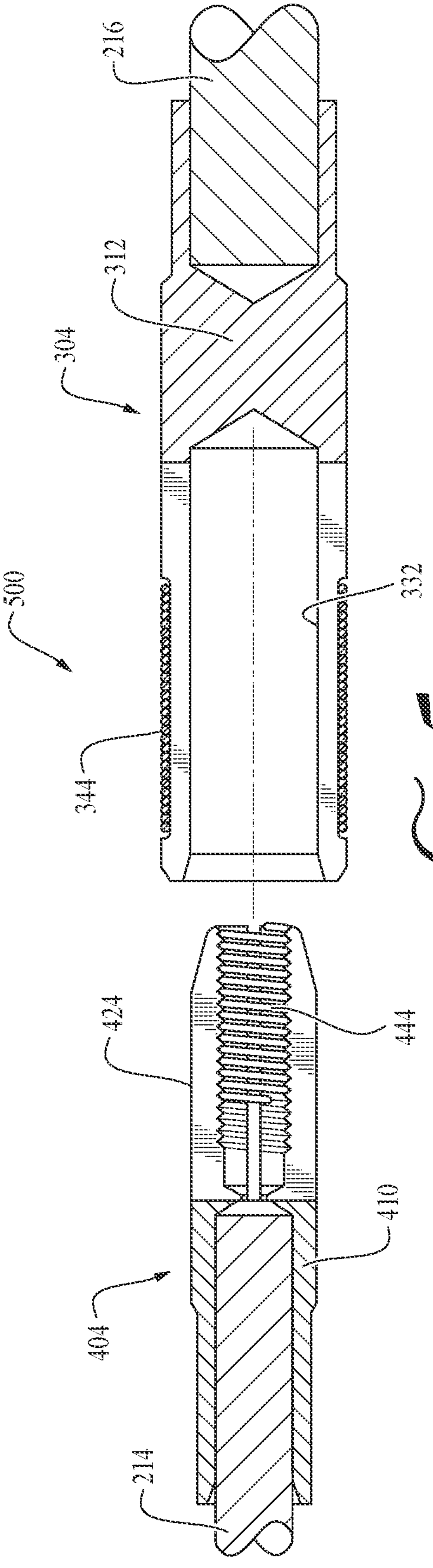
FIG. 5 is partial cross-sectional view of yet another connector assembly according to an embodiment of the disclosure.

Turning now to FIG. 5, still another embodiment of the connector assembly 134 is illustrated. For example, FIG. 5 is a partial cross-sectional view of an exemplary connector assembly 500 according to one or more embodiments of the present disclosure. The connector assembly 500 can comprise the pin assembly 404 of FIG. 4A and the socket assembly 304 of FIG. 3A. As previously described, the inner energizing spring 414 of the pin assembly 404 can bias the cantilever arms of the pin connector 410 outwards. The outer retaining spring 344 of the socket assembly 304 can bias the cantilever arms of the socket connector 312 inwards. As previously described, the level of spring stress within the inner energizing spring 414 and outer energizing spring 344 can apply a spring force to reduce the contact resistance of the electrical connection via an increase in contact stress between the inner surface 332 of the socket connector 312 and outer surface 424 of the pin connector 410. The service personnel can install or apply an insulating member onto the outside of the mated pin assembly 404 and socket assembly 304 as will be described further herein.

Connector assembly 500 can be an embodiment of connector assembly 134 located outside of the ESP pump assembly 150 or located anywhere along the production tubing 122. Likewise, connector assembly 500 can be an embodiment of internal connector assembly 140 within the motor section 116 of the ESP pump assembly 150 or within a housing of a downhole device, e.g., an inflow control valve.

Figure 6A:
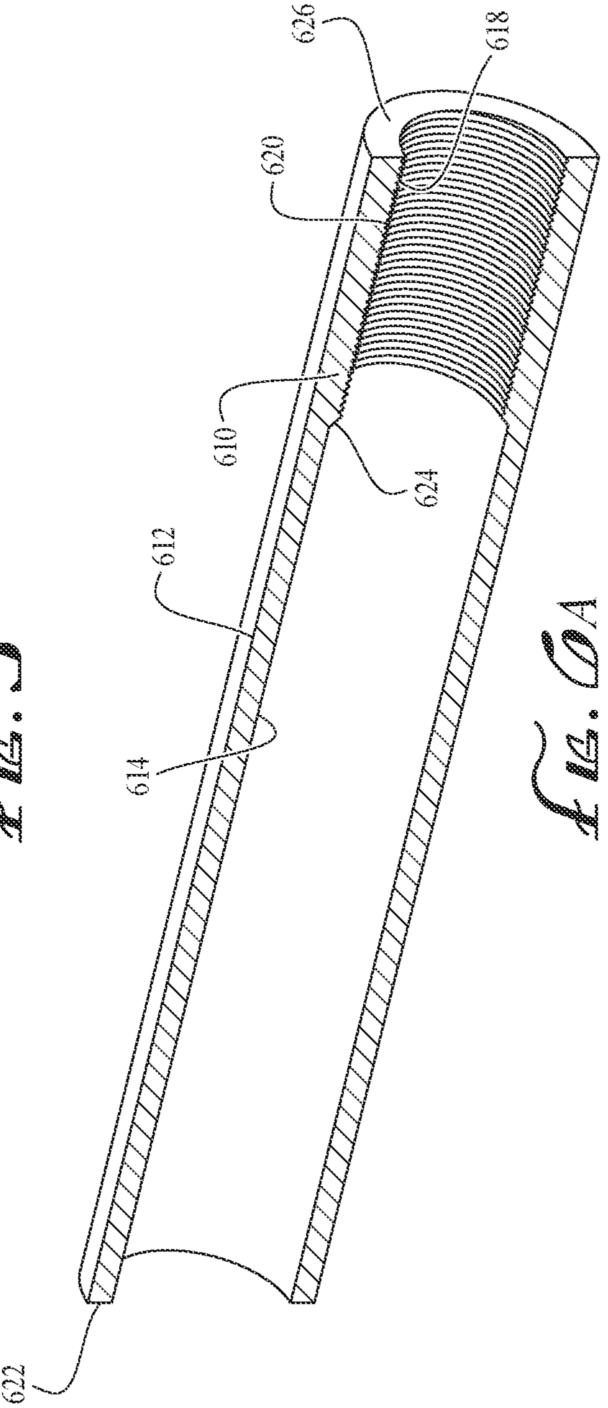
FIG. 6A is partial cross-sectional view of an insulation device according to an embodiment of the disclosure.
Figure 6B:
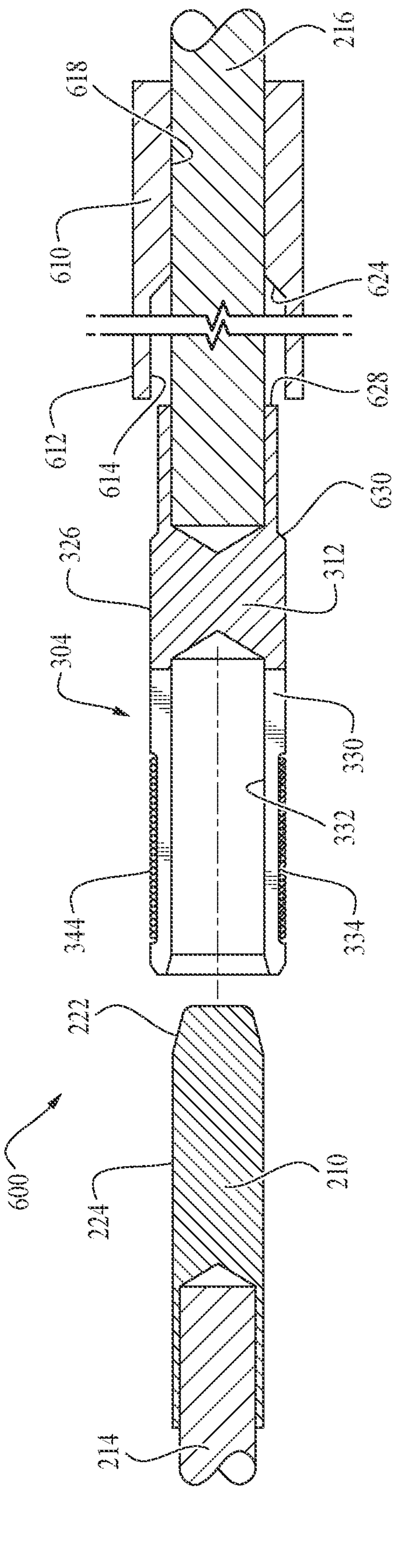
FIG. 6B is partial cross-sectional view of yet another connector assembly with an insulation device according to an embodiment of the disclosure.

The connector assembly can have an insulating member pre-installed on the power cable 110 or the motor lead 136 prior to mating the connector assembly. Turning now to FIGS. 6A and 6B, a cross-sectional view of a connector assembly 600 with an insulating member is shown. In some embodiments, the connector assembly 600 comprises the pin connector 210, the socket assembly 304, and the insulating member 610. The insulating member 610 can be a generally cylinder shape with an outer surface 612, an inner surface 614, and an inner bore 620. In some embodiments, the inner bore 620 can be a sliding fit over the outer surface of the power cable 110. In some embodiments, inner surface 614 can be threaded with a flat or blunted profile and a thread lead (e.g., turns per inch) similar in size to the lead (e.g., turns per inch) of the outer energizing spring 344. In some embodiments, a threaded inner surface 618 of the inner bore 620 can be threaded with a flat or blunted profile and a thread lead (e.g., turns per inch) similar in size to the lead (e.g., turns per inch) of the outer energizing spring 344. The insulating member 610 can have a front face 622, a back face 626, and an inner shoulder 624. The inner bore 620 can begin with the inner shoulder 624 and end at the back face 626. Although the connector assembly 600 is described with pin connector 210 and socket assembly 304, it is understood that the connector assembly 600 could comprise any combination of pin connector 210 or pin assembly 404 mated with socket connector 212, socket connector 412, or socket assembly 304.

Figure 6C:
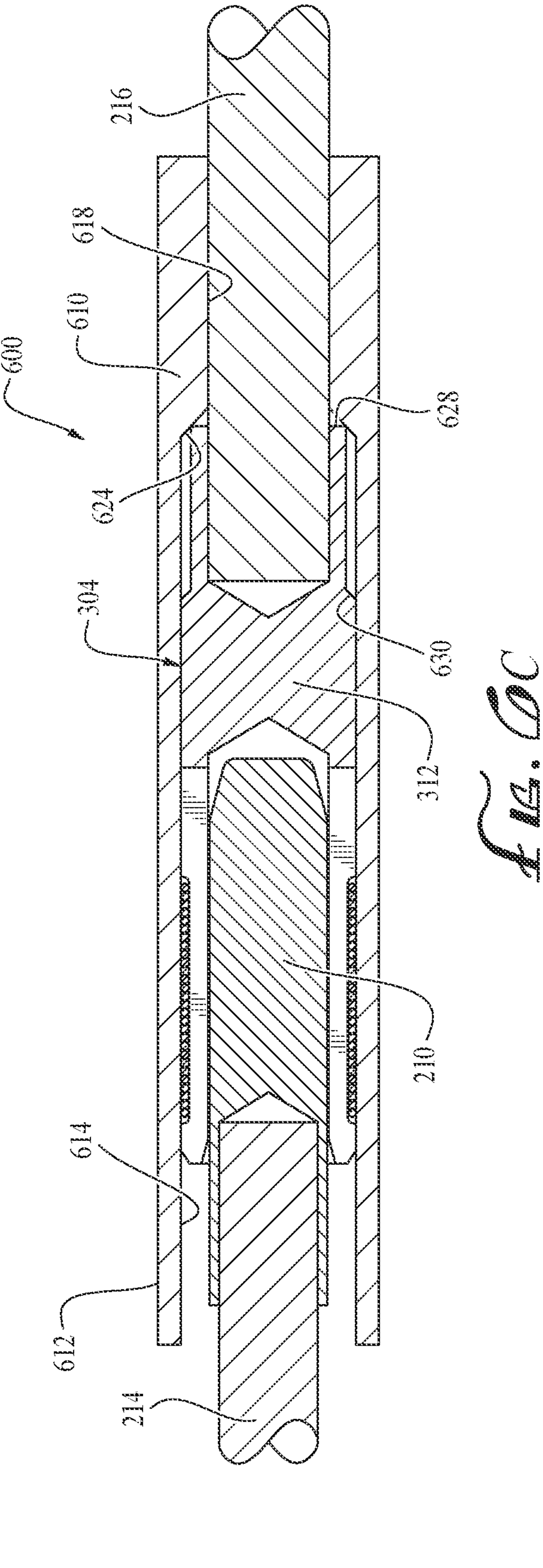
FIG. 6C is partial cross-sectional view of yet another connector assembly with an insulation device according to an embodiment of the disclosure.

The insulating member 610 can be installed on the power cable 216 or motor lead 214. In some embodiments, the insulating member 610 can be pushed up the power cable 216 or motor lead 214 with the inner bore 620 sliding over the outer surface of either cable. In some embodiments, the threaded inner surface 618 can engage the outer layer of insulation the power cable 110 (or the motor lead 214) in a manner that deflects or indents the insulation without cutting into or damaging the insulation layer. The insulating member 610 can be installed by rotating the insulating member 610 in a manner that allows the threaded inner surface 618 to engage the outer layer of insulation and thread upwards away from the end of the power cable 216 (or motor lead 214) to uncover or expose the connector for installation. As illustrated in FIG. 6C, the socket assembly 304 can be coupled with the end of the power cable 216.

Turning now to FIG. 6B, the service personnel can mate the pin connector 210 to the socket assembly 304 and install the insulating member 610 over the mated connector. In some embodiments, outside diameter of the outer energizing spring 344 of the socket assembly 304 can be larger than the outer surface 326 of the socket connector 312. The inner surface 614 of the insulating member 610 can engage the outer energizing spring 344 in a manner that deflects or indents the insulating member 610 without cutting into or damaging the inner surface 614. In some embodiments, the threaded profile within the inner surface 614 of the insulating member 610 can engage the outer surface 326 and/or the outer energizing spring to threadingly couple the insulating member 610 to the socket assembly 304. The service personnel can rotate the insulating member 610 in a manner to thread along the helix wrap of the spring wire until the end surface 628 and/or the outer shoulder 630 of the socket connector 312 abuts the inner shoulder 624 of the insulation member 610.

In some embodiments, the insulation member 610 can be installed by threading the insulation member 610 along the power cable 216 (or the motor lead 214). The threaded inner surface 618 of the insulation member 610 can be engaged with the outer surface of the power cable 216 and the outer energizing spring 344 may not engage the inner surface 614 of the insulation member 610. The service personnel can rotate the insulating member 610 in a manner to thread along the outer surface of the power cable 216 until the end surface 628 and/or the outer shoulder 630 of the socket connector 312 abuts the inner shoulder 624 of the insulation member 610.

In some embodiments, the insulation member 610 can be installed by threading the insulation member 610 along the power cable 216 (or the motor lead 214) and the outer energizing spring 344 may engage the inner surface 614 of the insulation member 610. The service personnel can rotate the insulating member 610 in a manner to thread along the outer surface of the power cable 216 until the inner surface 614 engages the outer energizing spring 344, and then continue rotating until the inner shoulder 624 abuts the socket connector 312.

Connector assembly 600 can be an embodiment of connector assembly 134 located outside of the ESP pump assembly 150 or located anywhere along the production tubing 122. Likewise, connector assembly 600 can be an embodiment of internal connector assembly 140 within the motor section 116 of the ESP pump assembly 150 or within a housing of a downhole device, e.g., an inflow control valve.

Figure 7A:
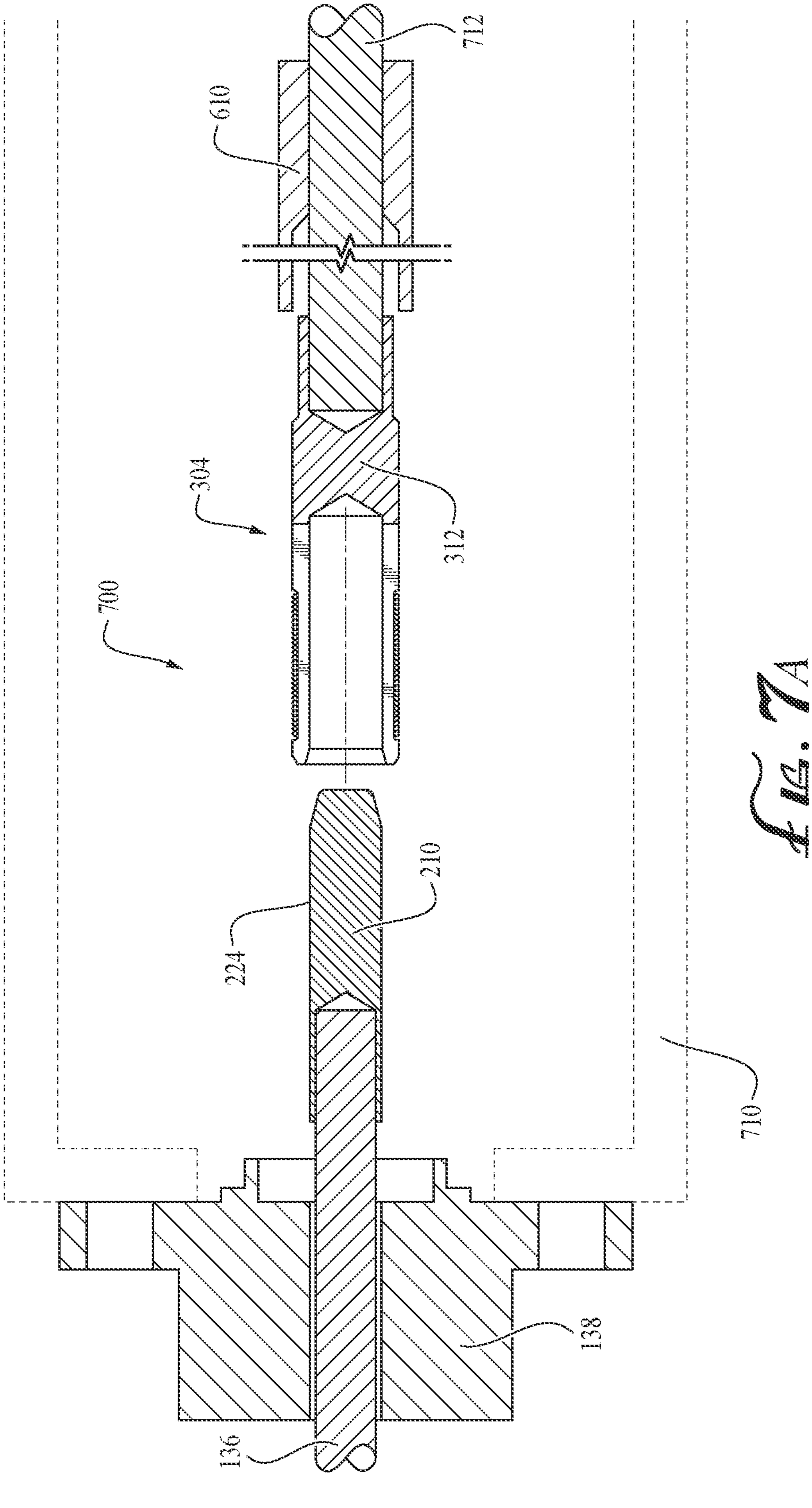
FIG. 7A is partial cross-sectional view of a connector assembly with an insulation device installed within a housing according to an embodiment of the disclosure.
Figure 7B:
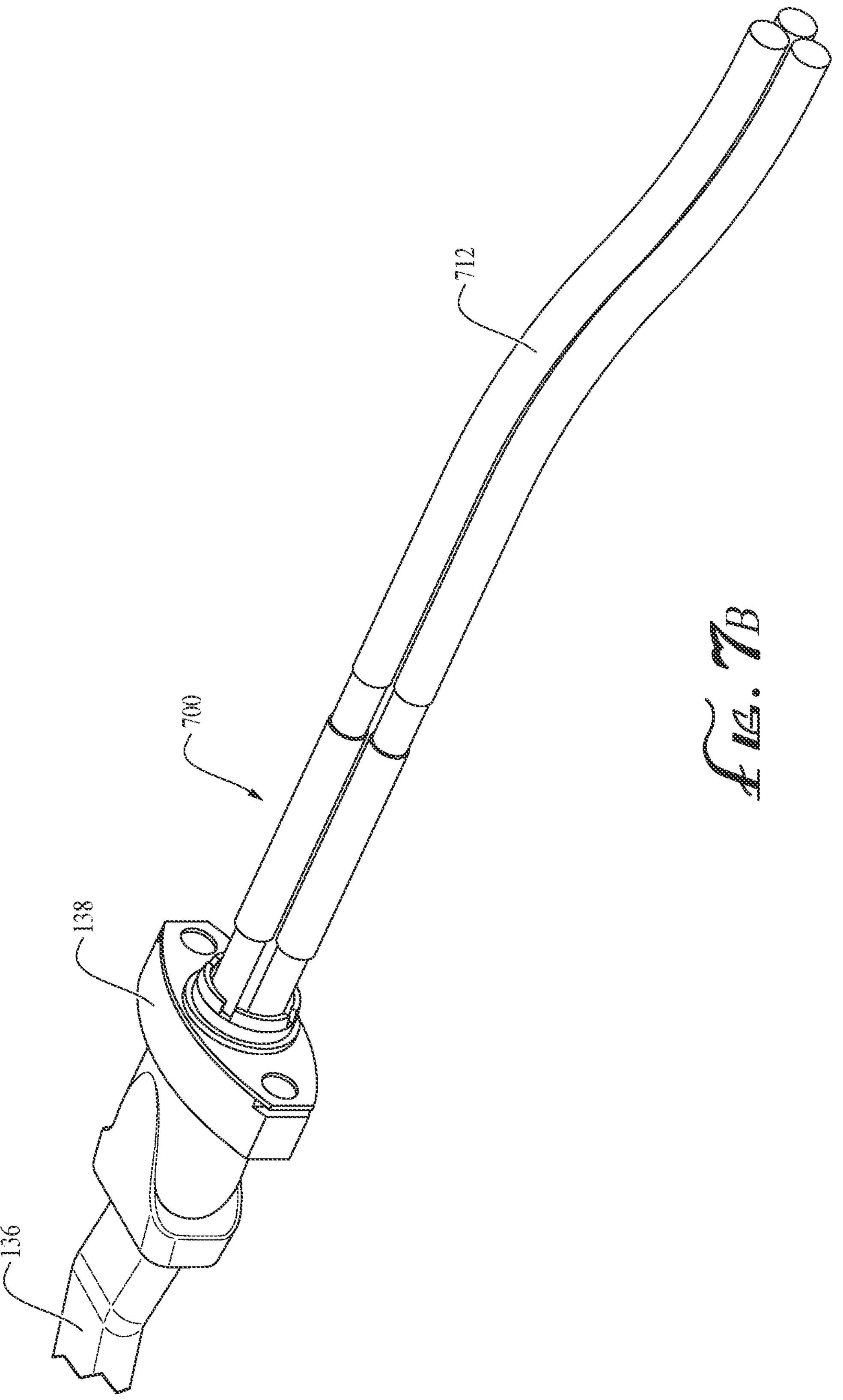
FIG. 7B is an illustration of a connector assembly with an insulation device installed within a housing according to an embodiment of the disclosure.

The connector assembly can be utilized in the wellbore above a downhole device or within a downhole device. Referring back to FIG. 1, in some embodiments the connector assembly can be used above a downhole device, e.g., connector assembly 134, or within a downhole device, e.g., internal connector assembly 140. Turning now to FIG. 7A, an embodiment of the internal connector assembly 140 is illustrated. For example, FIGS. 7A and 7B are a partial cross-sectional view and an isometric view of an exemplary connector assembly 700 according to one or more embodiments of the present disclosure. In some embodiments, the connector assembly 700 comprises the pin connector 210, the socket assembly 304, and the insulating member 610. Although the connector assembly 700 is described with pin connector 210 and socket assembly 304, it is understood that the connector assembly 700 could comprise any combination of pin connector 210 or pin assembly 404 mated with socket connector 212, socket connector 412, or socket assembly 304.

In some embodiments, the service personnel can remove the pothead connector 138 from a housing 710. The housing 710 can be the housing of the motor section 116 of the ESP system 150 as shown in FIG. 1 or a housing of a downhole device, for example, an inflow control valve. The service personnel can feed the motor lead 136 through the pothead connector and couple the pin connector 210 to the motor lead 136. The service personnel can retrieve a stator lead 712 from the housing 710, install the insulation member 610 onto the stator lead 712, and couple the socket assembly 304 onto the stator lead 712. The pin connector 210 can be mated to the socket assembly 304. The insulation member 610 can be installed over the mated connectors. The connector assembly 700 can be installed inside the housing 710 and the pothead connector 138 can be sealingly coupled to the housing 710. The pothead connector 138 can comprise a set of seals to sealingly engage each phase of the motor lead 136 or power cable 110. In some embodiments, the insulation member 610 can be installed onto the motor lead 136.

The assembly of the connector assembly 134 and/or internal connector assembly 140 can be performed at a remote wellsite. A downhole device, e.g., ESP system 150, may be transported to the remote wellsite as separate sections, e.g., motor section 116, the motor lead 136, the power cable 110, and the connector assembly. The downhole device can be assembled first, for example, the ESP system 150 can be assembled and coupled to a first section (i.e., a first joint) of the production tubing 122. The motor lead 136 can be coupled to the stator lead 712 with an embodiment of the internal connector assembly 140, for example, connector assembly 700. The pothead connector 138 can be sealingly coupled to the motor section 116 and the motor lead 136. The motor lead 136 can be coupled to the power cable 110 by an embodiment of the connector assembly 134, e.g., connector assembly 500. The power cable 110 can be attached or coupled to the production tubing 122 as the downhole device is lowered into the wellbore 104. When the downhole device has reached the target depth, the production tubing 122 can be secured to a wellhead, e.g., production tree, and the power cable 110 can be electrically coupled to the controller 120 at surface 102.

ADDITIONAL DISCLOSURE

The following are non-limiting, specific embodiments in accordance and with the present disclosure:

A first embodiment, which is a connector assembly, comprising a pin assembly comprises a pin connector generally cylindrical in shape with an outer surface; a socket assembly comprises a socket connector generally cylindrical in shape with an outer surface and an inner surface; wherein the outer surface of the pin connector is in direct contact with the inner surface of the socket connector in response to the pin connector mechanically coupling to the socket connector; and wherein the connector assembly is configured to electrically couple the pin connector to the socket connector via a contact surface area formed between the outer surface of the pin connector and the inner surface of the socket connector.

A second embodiment, which is the connector assembly of the first embodiment, further comprising an insulating device, wherein the insulating device is a wrap of insulating tape or an insulating member.

A third embodiment, which is the connector assembly of any of the first and the second embodiments, wherein the insulating member is generally cylindrical in shape with an outer surface, an inner surface, and an inner bore.

A fourth embodiment, which is the connector assembly of any of the first through the third embodiments, wherein the inner bore threadingly engages an outer surface of a power cable, a motor lead, the outer surface of the socket connector, an outer energizing spring, or combinations thereof.

A fifth embodiment, which is the connector assembly of the first through the fourth embodiments, wherein the socket connector comprises at least two cantilever beams formed by at least two slots extending from the outer surface to the inner surface.

A sixth embodiment, which is the connector assembly of any of the first through the fifth embodiments, wherein the socket assembly further comprises an energizing spring installed into a groove along the outer surface; and wherein the energizing spring is configured to increase a contact stress value of the contact surface area.

A seventh embodiment, which is the connector assembly of any of the first through the sixth embodiment, wherein the pin connector comprises at least two cantilever beams formed by at least two slots extending from the outer surface to the inner surface.

An eighth embodiment, which is the connector assembly of any of the first through the seventh embodiments, wherein the pin assembly further comprises an inner energizing spring installed into a threaded profile within an inner bore; and wherein the inner energizing spring is configured to increase a contact stress value of the contact surface area.

A ninth embodiment, which is the connector assembly of any of the first through the eighth embodiments, wherein the socket connector is coupled to a motor lead and the pin connector is couple to a power cable, or the socket connector is coupled to the power cable and the pin connector is coupled to the motor lead.

A tenth embodiment, which is the connector assembly of any of the first through the ninth embodiments, wherein the connector assembly is an internal connector assembly configured to be installed within a housing of a downhole device.

A eleventh embodiment, which is a method of connecting a power cable to a downhole device with a connecting assembly, comprising: placing an insulator member onto a phase of a first cable, wherein the insulator member is generally cylindrical in shape with an outer surface and an inner surface; mechanically coupling a socket assembly to the first cable; mechanically coupling a pin assembly to a second cable; forming the connecting assembly by mating the pin assembly into the socket assembly; and installing the insulator member onto the connection assembly, wherein the insulator member is coupled to the connection assembly by rotational motion.

A twelfth embodiment, which is the method of the eleventh embodiment, further comprising passing the first cable or the second cable through a pothead connector.

A thirteenth embodiment, which is the method of any of the eleventh through the twelfth embodiments, wherein the first cable is a phase of i) a power cable, ii) a motor lead, or iii) a stator lead; wherein the second cable is a phase of i) a power cable, ii) a motor lead, or iii) a stator lead; and wherein the first cable and second cable are different.

A fourteenth embodiment, which is the method of any of the eleventh through the thirteenth embodiments, further comprising transporting the downhole device, the first cable, the second cable, and the connecting assembly to a remote wellsite; electrically coupling the downhole device to a controller at surface via the connecting assembly; wherein the first cable or the second cable is electrically coupled to the downhole device; and wherein the first cable or the second cable is electrically coupled to the controller at surface.

A fifteenth embodiment, which is a system, comprising a controller; a power cable electrically coupled to the controller; a downhole device; a motor lead electrically coupled to the downhole device; a connection assembly comprising a pin assembly mated within a socket assembly; wherein the socket assembly comprises a socket connector mechanically coupled to a first cable; wherein the pin assembly comprises a pin connector mechanically coupled to a second cable; wherein the socket connector is generally cylindrical in shape with an outer surface and an inner surface, wherein the socket connector comprises at least two cantilever beams formed by at least two slots extending from the outer surface to the inner surface, wherein the socket assembly further comprises an energizing spring installed into a groove along the outer surface; and wherein the connection assembly is configured to electrically couple the controller to the downhole device.

A sixteenth embodiment, which is the system of the fifteenth embodiment, further comprising an insulating member generally cylindrical in shape with an outer surface, an inner surface, and an inner bore.

A seventeenth embodiment, which is the system of the fifteenth and sixteenth embodiment, wherein: the first cable is i) a power cable, ii) a motor lead, or iii) a stator lead; wherein the second cable is i) a power cable, ii) a motor lead, or iii) a stator lead; and wherein the first cable and second cable are different.

An eighteenth embodiment, which is the system of the seventeenth embodiment, wherein the connection assembly is a splice located outside of the downhole device.

A nineteenth embodiment, which is the system of the fifteenth through the eighteenth embodiments, wherein the connection assembly is located inside of a housing.

A twentieth embodiment, which is the system of the fifteenth embodiment, wherein the connection assembly is an internal connection assembly located inside of the downhole device.

A twenty-first embodiment, which is the system of the fifteenth embodiment, wherein the inner surface is configured to engage the energizing spring.

A twenty-second embodiment which is the system of any of the fifteenth through twenty-first embodiments, wherein the insulating member is installed over the connection assembly with rotational motion.

A twenty-third embodiment which is the system of the fifteenth embodiment, wherein: the pin connector comprises at least two cantilever beams formed by at least two slots extending from the outer surface to the inner surface; and wherein the pin assembly further comprises an inner energizing spring installed into a threaded profile within an inner bore.

A twenty-fourth embodiment which is the system of the fifteenth embodiment, wherein the downhole device is an Electrical Submersible Pump (ESP) system.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term “optionally” with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A connector assembly, comprising:

a pin assembly comprises a pin connector generally cylindrical in shape with an outer surface;

a socket assembly comprises a socket connector generally cylindrical in shape with an outer surface and an inner surface;

wherein the outer surface of the pin connector is in direct contact with the inner surface of the socket connector in response to the pin connector mechanically coupling to the socket connector; and wherein the connector assembly is configured to electrically couple the pin connector to the socket connector via a contact surface area formed between the outer surface of the pin connector and the inner surface of the socket connector; and wherein either: (i) the socket assembly further comprises an energizing spring installed into a groove along the outer surface and wherein the energizing spring is configured to increase a contact stress value of the contact surface area, or (ii) the pin assembly further comprises an inner energizing spring installed into a threaded profile within an inner bore and wherein the inner energizing spring is configured to increase a contact stress value of the contact surface area.

2. The connector assembly of claim 1, further comprising an insulating device, wherein the insulating device is a wrap of insulating tape or an insulating member.

3. The connector assembly of claim 2, wherein the insulating member is generally cylindrical in shape with an outer surface, an inner surface, and an inner bore.

4. The connector assembly of claim 3, wherein the inner bore threadingly engages an outer surface of a power cable, a motor lead, the outer surface of the socket connector, an outer energizing spring, or combinations thereof.

5. The connector assembly of claim 1, wherein the socket connector comprises at least two cantilever beams formed by at least two slots extending from the outer surface to the inner surface.

6. The connector assembly of claim 1, wherein the socket assembly comprises the energizing spring installed into the groove along the outer surface; and wherein the energizing spring is configured to increase the contact stress value of the contact surface area.

7. The connector assembly of claim 1, wherein the pin connector comprises at least two cantilever beams formed by at least two slots extending from the outer surface to the inner surface.

8. The connector assembly of claim 1, wherein the pin assembly comprises the inner energizing spring installed into the threaded profile within the inner bore; and wherein the inner energizing spring is configured to increase the contact stress value of the contact surface area.

9. The connector assembly of claim 1, wherein the socket connector is coupled to a motor lead and the pin connector is couple to a power cable, or the socket connector is coupled to the power cable and the pin connector is coupled to the motor lead.

10. The connector assembly of claim 1, wherein the connector assembly is an internal connector assembly configured to be installed within a housing of a downhole device.

11. A system, comprising:

a controller;

a power cable electrically coupled to the controller;

a downhole device;

a motor lead electrically coupled to the downhole device;

a connection assembly comprising a pin assembly mated within a socket assembly;

wherein the socket assembly comprises a socket connector mechanically coupled to a first cable;

wherein the pin assembly comprises a pin connector mechanically coupled to a second cable;

wherein the socket connector is generally cylindrical in shape with an outer surface and an inner surface, wherein the socket connector comprises at least two cantilever beams formed by at least two slots extending from the outer surface to the inner surface, wherein the socket assembly further comprises an energizing spring installed into a groove along the outer surface; and wherein the connection assembly is configured to electrically couple the controller to the downhole device.

12. The system of claim 11, wherein:

the first cable is i) a power cable, ii) a motor lead, or iii) a stator lead;

wherein the second cable is i) a power cable, ii) a motor lead, or iii) a stator lead; and wherein the first cable and second cable are different.

13. The system of claim 11, wherein the connection assembly is a splice located outside of the downhole device.

14. The system of claim 11, wherein the connection assembly is located inside of a housing.

15. The system of claim 11, wherein the connection assembly is an internal connection assembly located inside of the downhole device.

16. The system of claim 11, wherein the downhole device is an Electrical Submersible Pump (ESP) system.

* * * * *